US012407686B2

(12) United States Patent
Regalado et al.

(10) Patent No.: US 12,407,686 B2
(45) Date of Patent: *Sep. 2, 2025

(54) BIOMETRIC ACCESS TO SERVICE PROVIDERS

(71) Applicant: T-Mobile USA, Inc., Bellevue, WA (US)

(72) Inventors: Jonathan Regalado, Lynnwood, WA (US); Kirk W. McGettigan, Bellevue, WA (US); Sheetal Guttigoli, Bellevue, WA (US); Dustin Martinka, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 377 days.

This patent is subject to a terminal disclaimer.

(21) Appl. No.: 18/116,605

(22) Filed: Mar. 2, 2023

(65) Prior Publication Data

US 2023/0254307 A1    Aug. 10, 2023

Related U.S. Application Data

(63) Continuation of application No. 17/071,471, filed on Oct. 15, 2020, now Pat. No. 11,616,778.

(51) Int. Cl.
*H04L 29/06* (2006.01)
*H04L 9/40* (2022.01)

(52) U.S. Cl.
CPC ................ *H04L 63/0861* (2013.01)

(58) Field of Classification Search
None
See application file for complete search history.

(56) References Cited

U.S. PATENT DOCUMENTS

| 7,360,239 | B2* | 4/2008 | Mandalia | H04L 63/0861 |
| | | | | 713/186 |
| 9,892,732 | B1* | 2/2018 | Tian | G10L 15/24 |
| 11,256,791 | B2* | 2/2022 | Douglas | G06V 40/70 |
| 11,616,778 | B2 | 3/2023 | Regalado | |
| 2008/0092215 | A1* | 4/2008 | Soukup | H04L 63/0815 |
| | | | | 726/5 |
| 2008/0271122 | A1* | 10/2008 | Nolan | G06F 21/34 |
| | | | | 726/4 |

(Continued)

FOREIGN PATENT DOCUMENTS

WO    WO2018193713 A1    10/2018

OTHER PUBLICATIONS

Office Action (Final Rejection) dated Sep. 7, 2022 for U.S. Appl. No. 17/071,471 (pp. 1-9).

(Continued)

*Primary Examiner* — Piotr Poltorak
(74) *Attorney, Agent, or Firm* — Lee & Hayes, P.C.

(57) ABSTRACT

A contact may select to use a biometric input to access help and services related to the contact. On a portable computing device, a user may contact a help service. The help service contact address may be known and an app may execute if the contact attempts to communicate with the contact address. The app may receive the biometric data, compare it to known biometric data for the user and determine if the received biometric data is sufficiently close to the stored biometric data, the communication may be forwarded to a help or service agent.

20 Claims, 9 Drawing Sheets

(56) References Cited

U.S. PATENT DOCUMENTS

| | | |
|---|---|---|
| 2009/0097458 A1 | 4/2009 | Wu |
| 2011/0072264 A1* | 3/2011 | McNulty ............ G06F 21/6272 |
| | | 380/278 |
| 2013/0232073 A1 | 9/2013 | Sheets |
| 2017/0244688 A1 | 8/2017 | Kim |
| 2018/0278750 A1 | 9/2018 | Avila |
| 2020/0074062 A1 | 3/2020 | Lu |
| 2021/0056193 A1 | 2/2021 | Xia |
| 2022/0124089 A1 | 4/2022 | Regalado |

OTHER PUBLICATIONS

Office Action (Notice of Allowance and Fees Due (PTOL-85)) dated Nov. 30, 2022 for U.S. Appl. No. 17/071,471 (pp. 1-16).
Office Action (Notice of Allowance and Fees Due (PTOL-85)) dated Dec. 8, 2022 for U.S. Appl. No. 17/071,471 (pp. 1-15).
Office Action dated Apr. 14, 2022 for U.S. Appl. No. 17/071,471 (pp. 1-11).
Wikipedia (Machine Learning @ Wikipedia, author unknown, Dec. 1, 2019) (Year: 2019).
Office Action for Japanese Application No. 2022-579713, Dated Mar. 25, 2025, 12 pages.

* cited by examiner

BIOMETRIC ACCESS TO SERVICE PROVIDERS

CROSS-REFERENCE TO RELATED APPLICATIONS

This application is a continuation application of U.S. application Ser. No. 17/071,471, entitled "BIOMETRIC ACCESS TO SERVICE PROVIDERS", filed on Oct. 15, 2020, the entirety of which is hereby incorporated by reference.

BACKGROUND

Obtaining help or services can be a frustrating experience for both customers and for service providers. Service providers may be frustrated that they are not confident that a contact is a customer. Further, it may be a challenge to match a contact to specific equipment owned by the contact and any problems the contact may have had in the past. Similarly, contacts such as customer may be frustrated that they are not immediately recognized and that they may be required to input complex user ids, PINS passwords or other details that can be used to verify a user is the actual customer.

SUMMARY

A contact may select to use a biometric input to prequalify for access to help and services related to the contact if the service provider has a stored biometric input for the user. On a portable computing device, a user may contact a help service. The help service contact address may be known and an app may execute if the contact attempts to communicate with the contact address. The app may receive the biometric data, compare it to known biometric data for the user and determine if the received biometric data is sufficiently close to the stored biometric data, the communication may be forwarded to a help or service agent. In addition, a user interface may be created for the contact using data specific to the contact including equipment used by the contact, previous communications to the help service and current status of the account.

Figure 1:
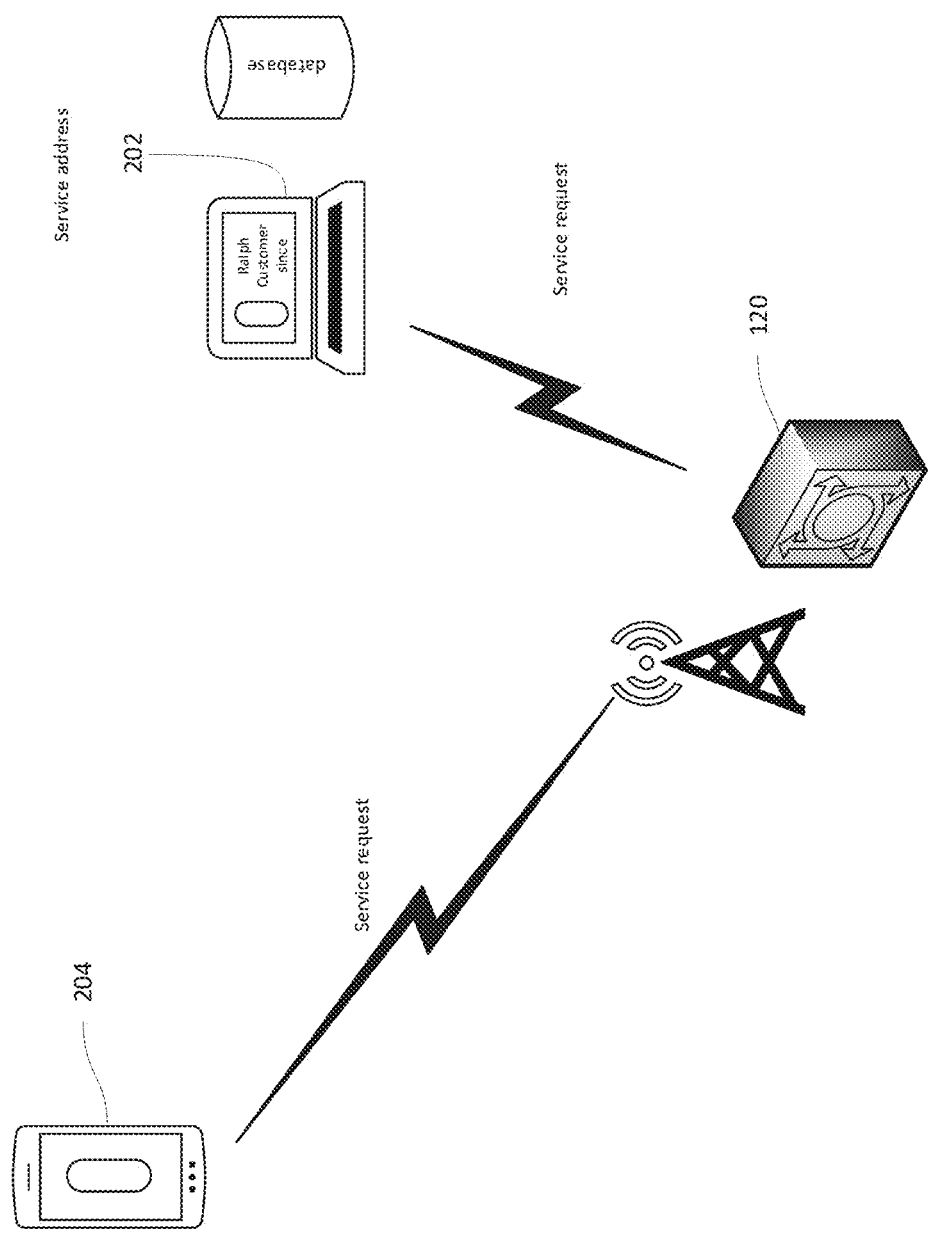
FIG. 1 may illustrate a sample environment and equipment.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

SPECIFICATION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The system and method may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Obtaining help or services can be a frustrating experience for both customers and for service providers. Service providers may be frustrated that they are not confident that a contact is a customer. Further, it may be a challenge to match a contact to specific equipment owned by the contact and any problems the contact may have had in the past. Similarly, contacts such as customer may be frustrated that they are not immediately recognized and that they may be required to input complex user ids, PINS passwords or other details that may be used to verify a user is the actual customer.

A contact may select to use a biometric input to access help and services related to the contact if the service provider has a stored biometric input for the user. On a portable computing device, a user may contact a help service. The help service contact address may be known and an app may execute if the contact attempts to communicate with the contact address. The app may receive the biometric data, compare it to known biometric data for the user and determine if the received biometric data is sufficiently close to the stored biometric data, the communication may be forwarded to a help or service agent. In addition, a user interface may be created for the contact using data specific to the contact including equipment used by the contact, previous communications to the help service and current status of the account.

FIG. 1 may illustrate a sample environment for the system and method. A user may have a computing device 204, which may be a portable computing device, such as a smart phone, tablet, laptop, etc. The computing device 204 may be further describe in FIG. 6.

The base station 120 may receive calls and data over a radio network and may communicate with other users. The base station 120 may have a processor physically configured to communicate signals from a user computing device 204 to a service computing device 202 if service is request by the user.

Figure 7:
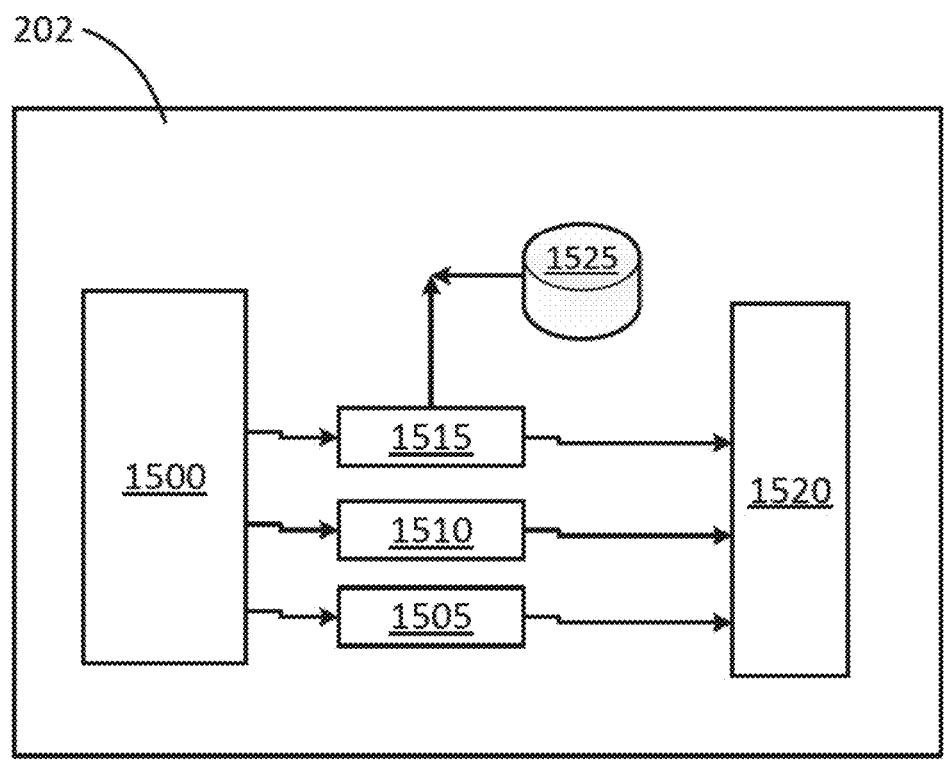
FIG. 7 may be an illustration of a server type computing device.

The service agent computer 202 may be further described in FIG. 7. The service agent computer 202 may operate contain a processor 1500 that is physically configured to respond to service requests which may be speech or data related.

Figure 2:
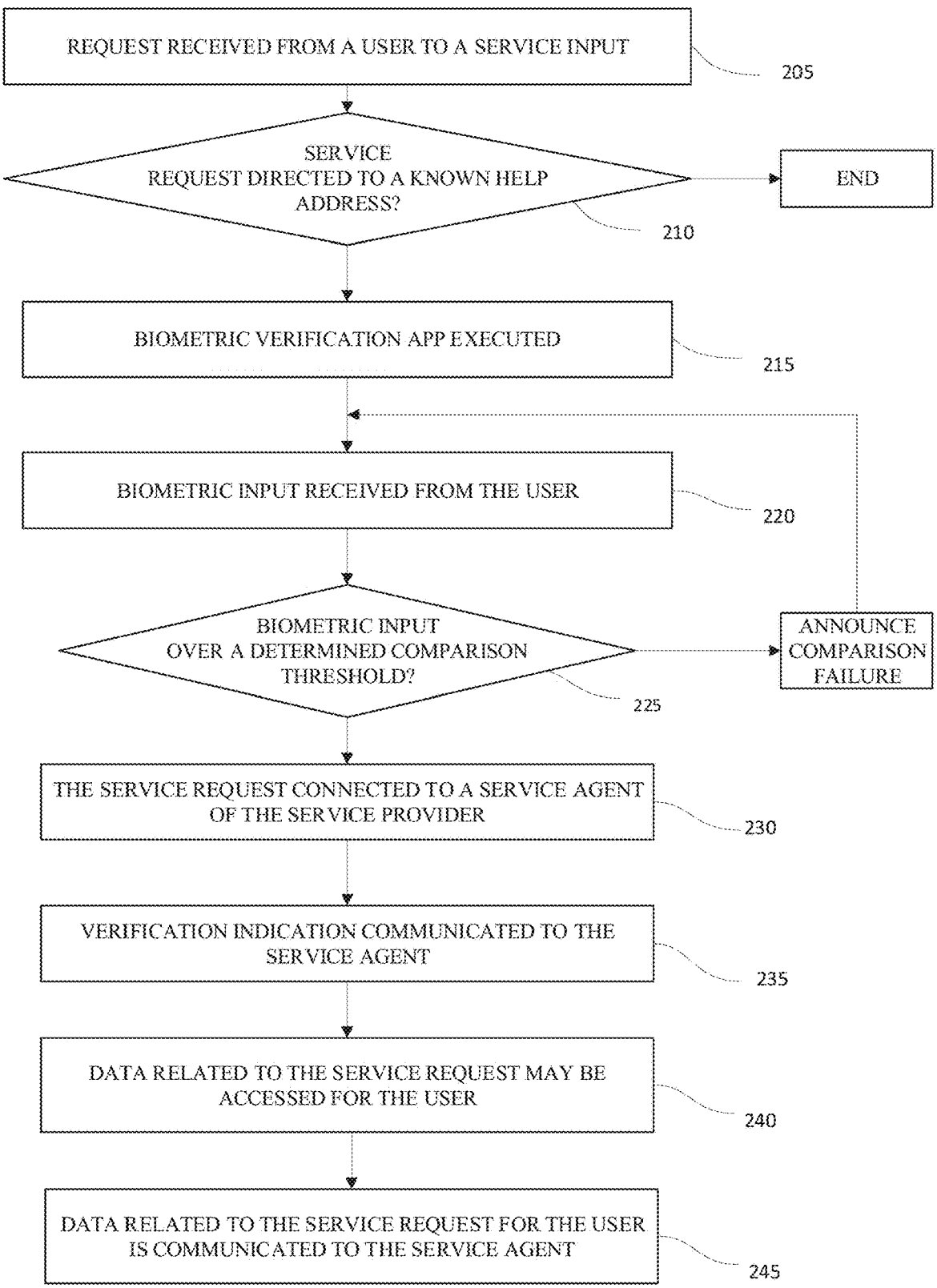
FIG. 2 may illustrate a method of using biometric inputs to permit access to a service.

Referring to FIG. 2, a method of pre-authenticating a user for services may be illustrated. The services may be any services such as help services or account questions or equipment problems. At block 205, a request may be received from a user to a service input. The request may be a voice request or a text request or any other appropriate form of communication. The request may be for any assistance where authorization to receive help may be needed. Some examples, which are not meant to be limiting, would be requesting help with software, for an account balance or for technical help with a device. As is known, some services require authorization. For example, checking for a balance on a phone plan should require that the user be authorized to learn the balance. Logically, the same authorization would be needed to check the balance on a credit card, bank account, airline mile account. Similarly, providing services may be costly and thus may only be available to authorized users to avoid the cost of providing the service to be excessive.

A service input may take on a variety of forms. In some embodiments, it may be a phone number or a domain address or ip address which is known to provide services that require authorization. As will be explained, the service input may be matched against a list of known service inputs which require authorization. In other embodiments, the service input may also be keywords such as "utility help" or "computer service."

At block 210, the system or method may determine if the service request is directed to a known help address. As mentioned above, some services require authorization to make sure that security is maintained and that the cost of providing services does not become excessive. The service input may be matched to a list of known service addresses to determine if authorization may be needed. The list of known service addresses may be stored locally or the service input may be communicated to an additional verification function or verification device to determine if the service address is for a service that requires authentication. The communication of the service input to the additional verification function or device may use an API to ensure that the input is correctly understood and that the response is communicated in a consistent manner. By using the verification function or device, the list of service inputs may be updated at a single source and would not need to be communicated to a plurality of individual user devices.

At block 215, in response to the service request being directed to a known service address, a biometric verification app may be executed. In some embodiments, the use of the verification app may be opted into by a user. Some users may not be comfortable with using a verification app and may prefer to proceed with a traditional system that uses user names and passwords, for example. In some embodiments, the app may already be installed on a user's computing device and the user may be given the option to use or not use the verification app. In other embodiments, a user may download and install the app. In some embodiments, the matching of the service request to a known service address may start the app and the user may have several options such as be permitted to close the app, set up the app, ignore the app this time, delete the app or use the app if it has already been set up.

Figure 3:
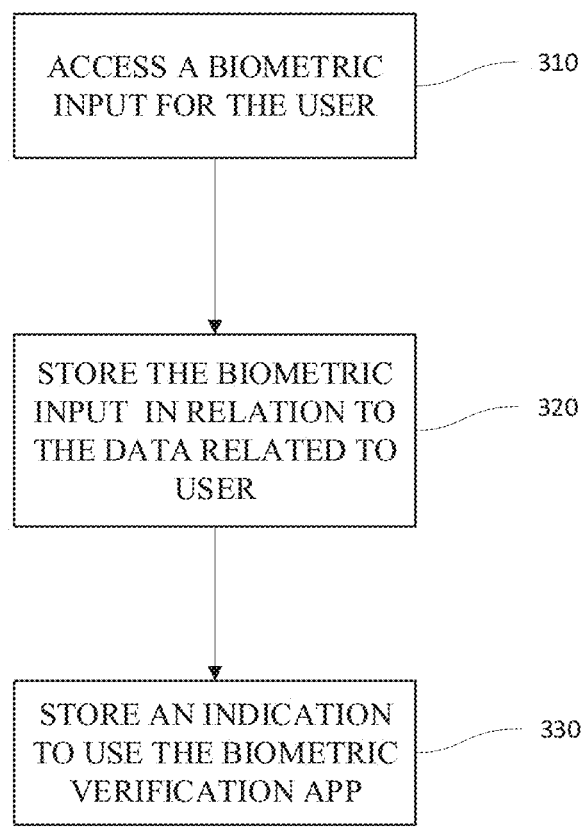
FIG. 3 may illustrate a method of determining if a biometric input is an acceptable input.

FIG. 3 may illustrate one system and method for determining if the user desires to use biometric input to obtain services. In general, biometric inputs are known. A biometric input may be any input that represents a characteristic of the user that may be difficult to replicate. For example, fingerprints are considered to be unique to each individual and may be a biometric input. In addition, facial features may create a unique pattern and may be a biometric input. Voices also may be an appropriate biometric input. The biometric input may also be a combination of inputs such as a plurality of fingerprints, iris scan, ear scan, the back of a user's hand alone, voice, etc. In addition, the inputs may be used in combination such as a facial image along with another input for additional security. FIGS. 5A-5G may illustrate sample user interfaces on a computing device 204 which may be used by the system and method.

At block 310, in response to the user desiring to use biometric input, the system and method may access a biometric input for the user. The biometric input may be accessed in a variety of ways. In one embodiment, the use may be requested to prove a biometric input and it may be captured. In another embodiment, the biometric input may already be stored in a secure storage either in the user device or remotely. By obtaining user verification through a traditional manner such as a password or a second channel verification code, access may be granted to the previously obtained biometric input.

At block 320, the biometric input may be stored in relation to the data related to user. As the biometric input may be useful to someone nefarious, the biometric input may be subject to security efforts. In one embodiment, the biometric input may be stored in a secure element on the user computing device. In an additional embodiment, the biometric input may be subject to an encryption algorithm. In another embodiment, tokens may be used to communicate the biometric input to any future verification attempts. Tokens may take a known value (a fingerprint value) and using a sophisticated algorithm turn it into a second value that has a limited time life. The second value may be communicated to an authority which also may have the sophisticated algorithm and may be able to determine if the second value represents a valid biometric input.

In some device, a biometric input may be used to access a variety of services and apps on the user device. For example, a biometric input may be used to open a smart phone or access a banking app. The biometric input may be accessed and used according to rules and procedures set out by the computing device manufacture, such as in a software development kit, an API or a paid subscription. The system and method described herein may leverage the biometric input already available in the user computing device 204 to provide the infrastructure to use biometrics to access services.

At block 330, an indication to use the biometric verification app may be stored in response to the user making a service request for help services. For example, if a user selects to use help by calling a cellular carrier, an indication may be stored in the app to execute the app when the user calls for services from the cellular carrier. Similarly, if the user selects to not use the biometric system and method when calling a utility for help, a negative indication may be stored for the phone number for the utility.

Referring again to FIG. 2, at block 220, a biometric input may be received from the user. A mentioned previously, the biometric input may be a representation of a physical aspect of a user such as a fingerprint, an iris scan, a facial scan, an image of a handprint, etc. In other embodiments, the biometric input may already be stored as a digital file and the biometric input may be the digital file or encrypted version of the digital file or a token which represents the biometric input stored in the digital file.

At block 225, the system and method may determine whether the biometric input is over a determined comparison threshold to a known biometric signature for the user to create a verification indication. At a high level, the received biometric input will be compared to the biometric input previously stored for the user when the app was set up. In some embodiments, the digital value of the submitted biometric input is compared to the store biometric input for the user and if the comparison is over a threshold, the submitted biometric input it approved. In other embodiments, vectors are used to connect common points on the submitted and stored biometric inputs and if the vector comparison is over a threshold, the submitted biometric input is approved. Of course, other ways of comparing submitted to stored biometric inputs are known and are contemplated.

At block 230, in response to the biometric input being determined to over a determined comparison threshold to a known biometric signature for the user, the service request may be connected to a service agent of the service provider. Logically, if authorization is required to obtain services, the user needs to be authorized. Once authorized, the request for service may be forwarded to the service agent. As a result of the system and method, the user may no longer be required to remember obscure PIN numbers or trivial facts such as the name of their first grade teachers pet, etc., and the user may proceed immediately to receive services rather than engaging in a prolonged question and answer session with a service agent or automated service. In addition, it is more difficult to copy biometric inputs meaning the service provider is more confident the user is the actual user.

At block 235, the verification indication may be communicated to the service agent 202. As a result, the service agent 202 may be able to immediately begin offering help to the user rather than asking a series of verification questions. The service agent 202 may be a human or an automated software service system which may use voice or text to respond.

At block 240, data related to the service request may be accessed for the user. For example, if the call is for cellular communication help, the data may describe the type of phone of the user, when the phone was put in service, the service plan of the user, the minutes and data used by the user and any previous service requests of the user, etc.

At block 245, data related to the service request for the user may be communicated to the service agent. If the service agent is a human, the data may be displayed on a user interface. The service agent will be able to more quickly understand the needs of the user as the equipment of the user and the past calls of the user may be displayed to the service agent. If the service agent is a device, the data may be communicated according to an API such that the service agent device may securely and efficiently receive the data.

Figure 4:
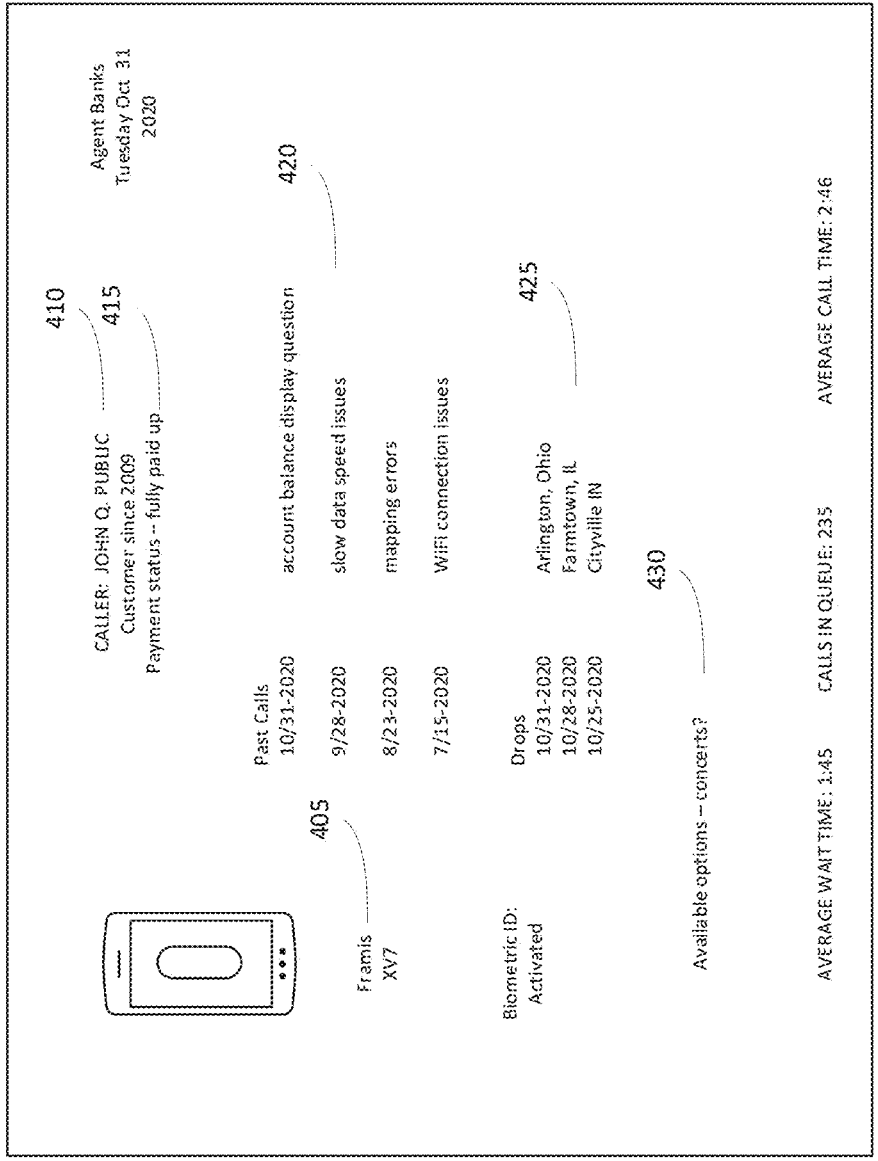
FIG. 4 may illustrate a sample user interface for a service provider.

Referring to FIG. 4, a user may be using a voice input to a service agent and the FIG. 4 may illustrate a display that is shown to a service agent. In some embodiments, this data may be communicated to an automated agent. The FIG. 4 may show the type of computing device 405 the user may have registered with the service provider such as the fictitious Framis XV7. The name of the caller 410 may also be displayed along with relevant data 415 about the user account. Past inquiries to service 420 may be displayed to help the service agent anticipate problems. Past dropped calls 425 may also be displayed to assist the service agent anticipate problems. Other options for issues to discuss with a caller 430 may also be displayed. Artificial intelligence may be used to anticipate issues that may be of interest to the user by studying past interest of the user or similar users.

For example, a Framis smart phone 202 may have a common issue of connecting to WiFi for phone calls. A patch may be available to address the problem. By automatically verifying the user, and pulling up the relevant user equipment 204, and determining that the patch has not yet been installed, the service agent 202 may be prepared to offer useful advice by anticipating problems that are specific to the user equipment and may have been addressed by other service agents previously.

Similarly, machine learning may be used to anticipate problems and provide proposed solutions which may be available to a service agent 202. Past problems with past equipment may be collected along with past solutions and a machine learning algorithm may be used to determine the most effective solution from a plurality of solutions. In addition, if there is not an exact match, the machine learning may be able to provide matches that are most similar. For example, a Framis XV6 may have a Mosquito chip as a processor and it may have difficultly playing videos. A Simarf phone may also have a Mosquito chip as a processor and machine learning may recognize that any phone with the Mosquito chip as a processor may have difficulty playing videos.

As mentioned previously, the service agent 202 may be automated in part or in whole. For example, the service agent 202 may receive an automated report from the user device 204 reporting a problem and the service agent computer 202 may communicate a response automatically if the report is understood and a known solution is available. For example, a report of an app crash may be fixed by communicating a patch to the app.

As an example and not limitation, a use case may be when a cell phone user calls for account help to the cell phone provider. The user may have to first add a biometric input to their account which may be accomplished through a user interface on the cellular device or by permitting access to the cellular provider of a previously stored biometric input. The biometric input may be encrypted and stored in a secure manner either on the device or remotely by the service provider. On future calls, the user may be presented the option to use biometric inputs to be pre-authorized to access help on their cellular account. If the user selects to use the pre-authorization app and the biometric input is verified, the user may immediately be put in touch with a service agent for the cellular provider who may have a display which contains the user's data such as phone type, plan type, payment history, previous calls, previous issues, etc. As a result, the technical problem of accurately verifying users is addressed by using an app to accept and analyze a more secure input which may be the biometric input.

Figure 5B:
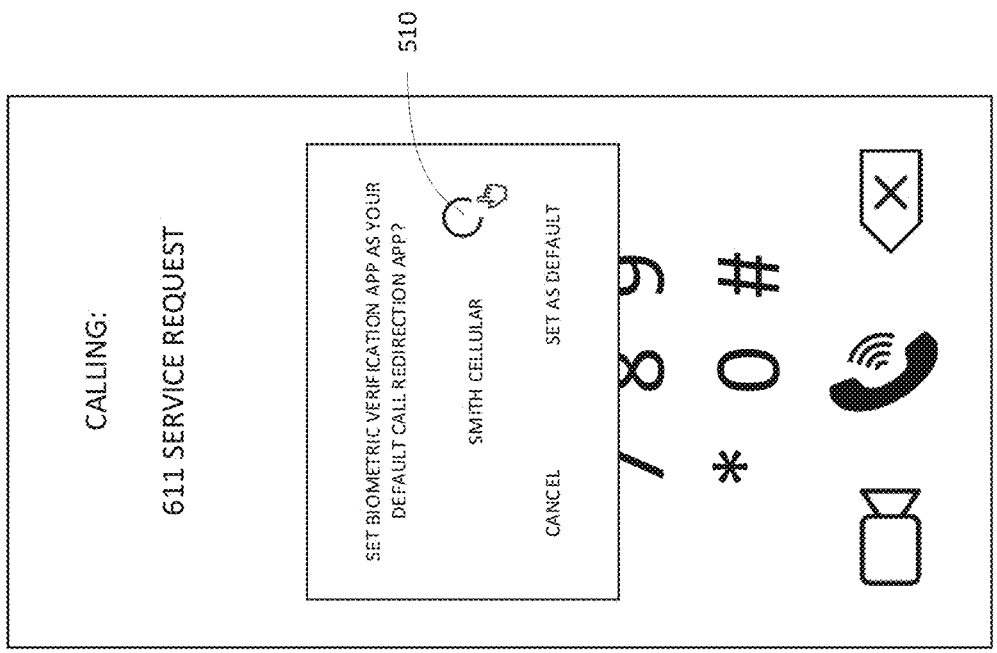
FIGS. 5A-5H may illustrate a user entering a biometric input to be validated to receive service.
Figure 5A:
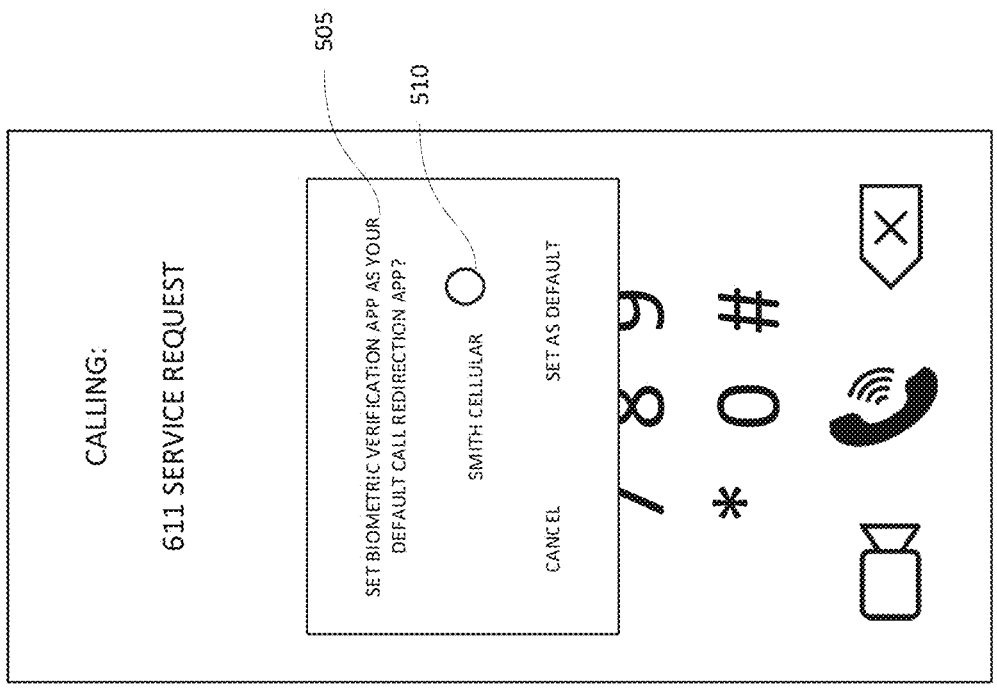
Figure 5D:
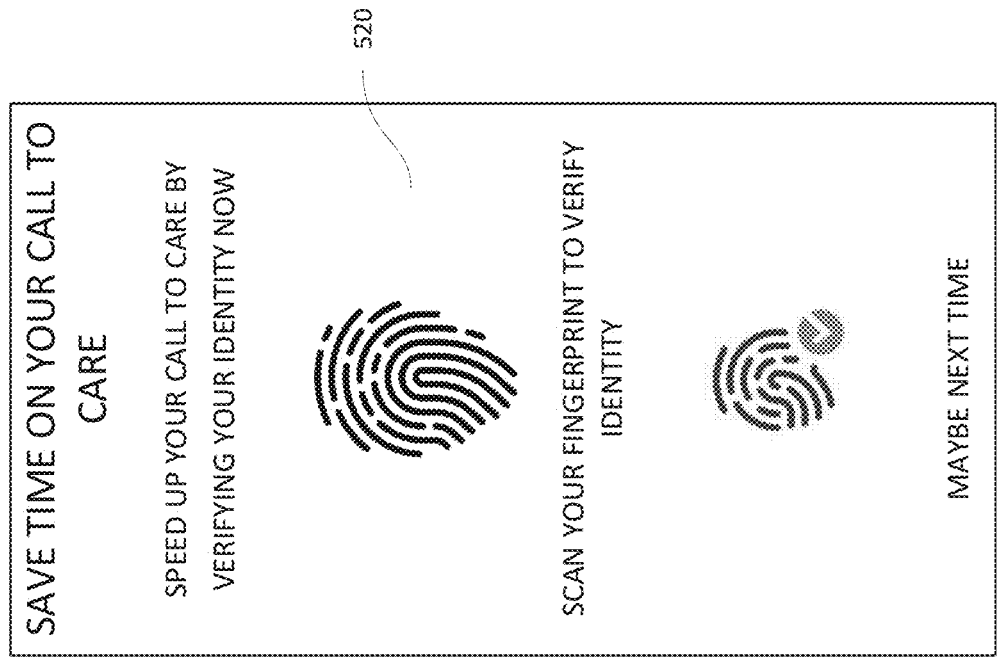
Figure 5C:
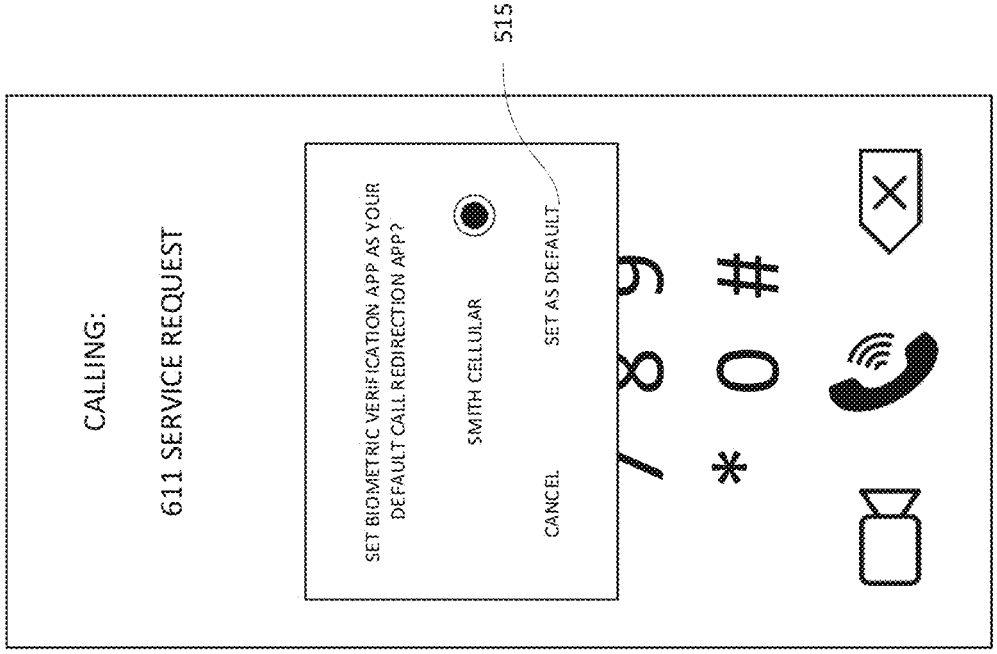

FIGS. 5A-5H may display a sample user interface flow from a user perspective. In FIG. 5A, a user may have dialed a number recognized as being a number for assistance that requires authentication and the app executes. A user is given the option to select the authentication app 510 as the default for future calls to this service agent that requires authentication 505. In FIG. 5B, two options are provided to a user to select to use the app 510 or cancel the use of the app. In FIG. 5C, the user selects to use the app 515 and set it as the default for future service calls to this service number.

Figure 5F:
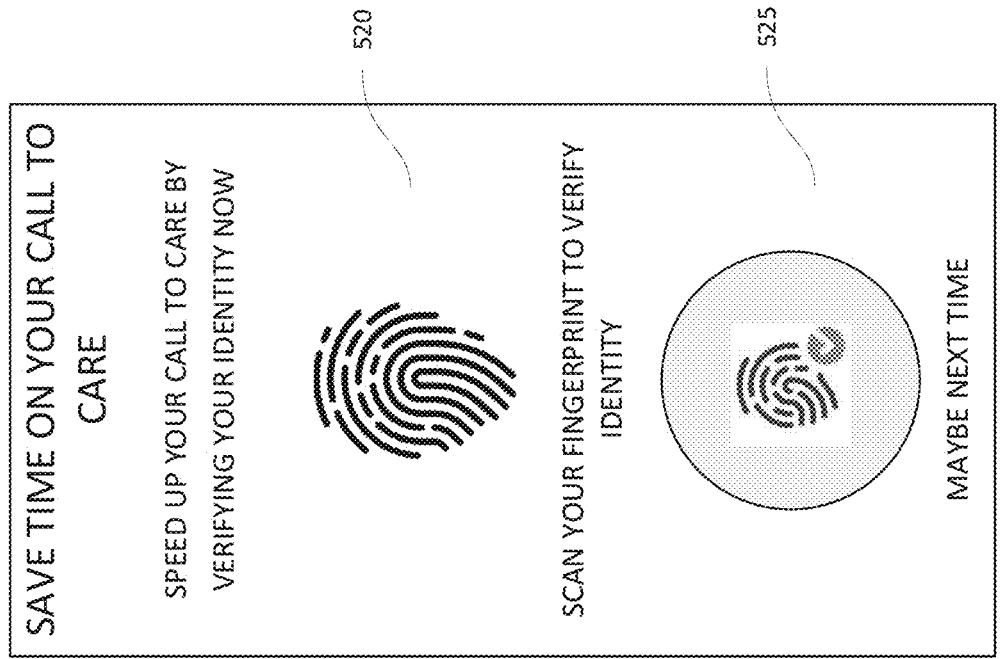
Figure 5E:
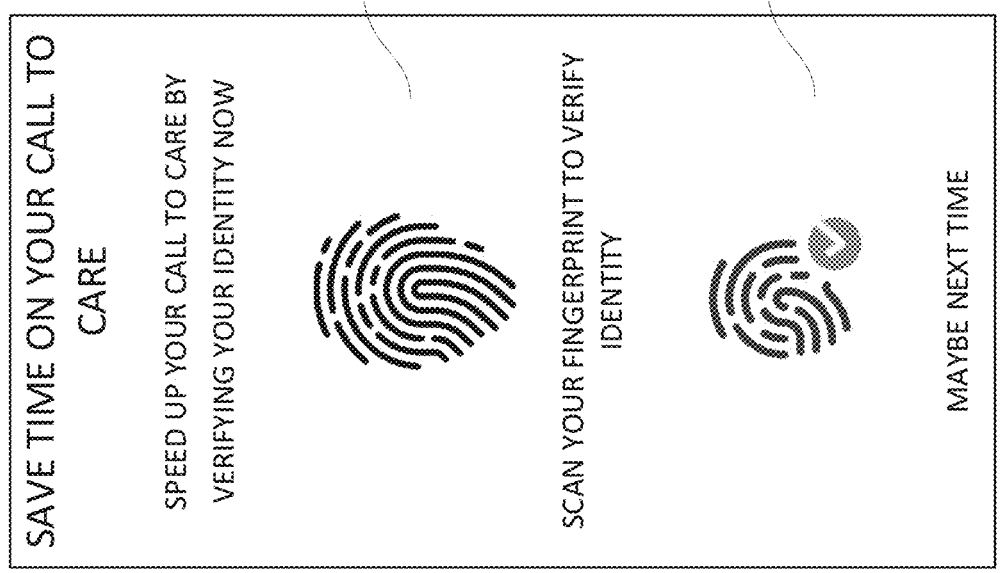
Figure 5H:
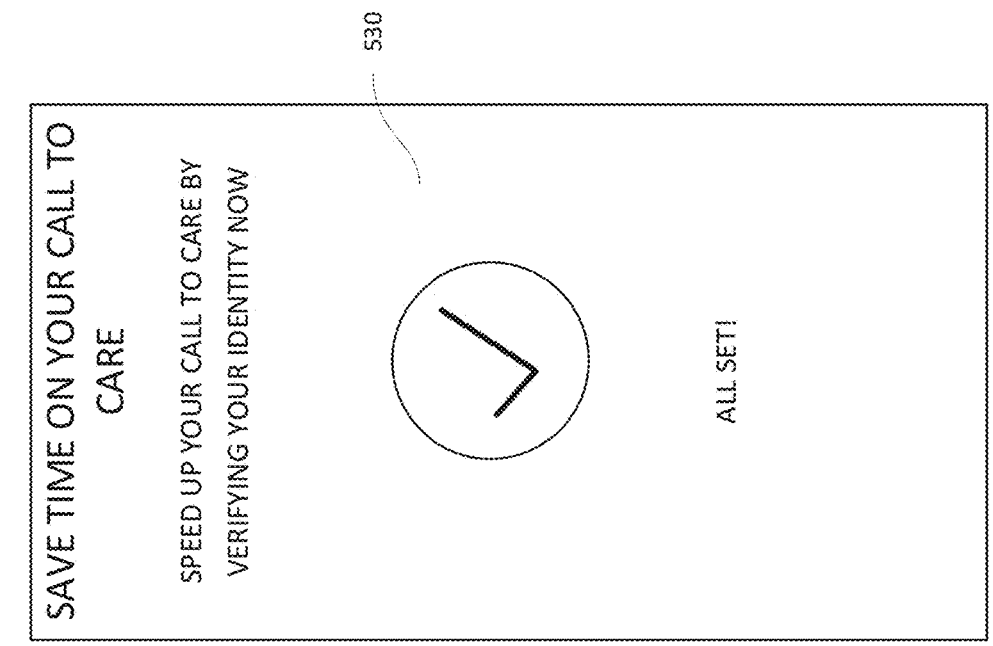
Figure 5G:
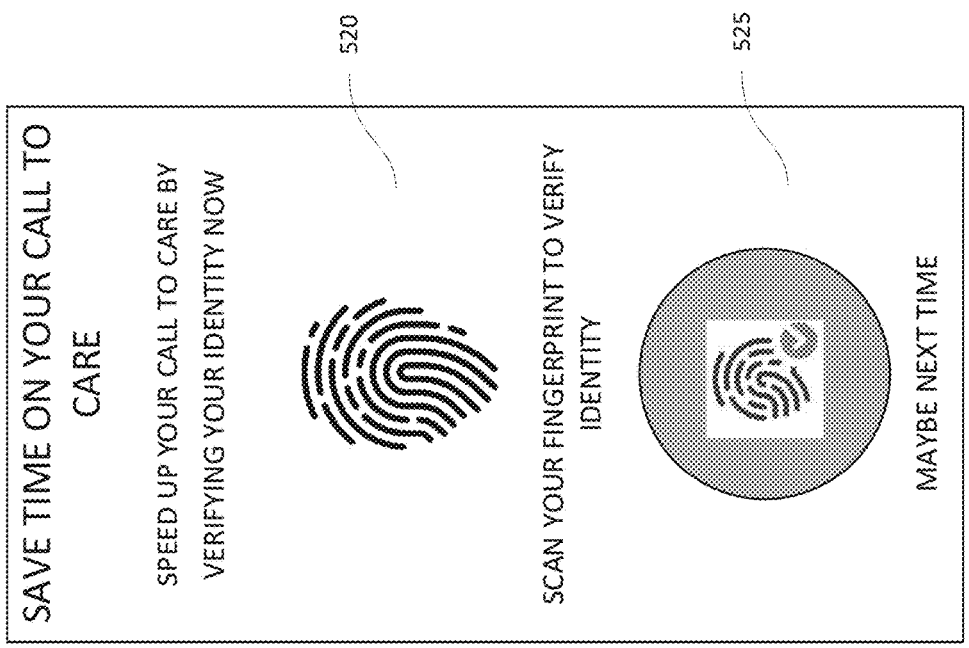

In FIG. 5D, the app continues to execute and request a biometric input from a user, in this case, a fingerprint 520. In FIG. 5E, a user begins to move the pointer to select either "MAYBE NEXT TIME" or the fingerprint icon 520 to use the biometric input and the fingerprint begins to be read 525. In FIG. 5F, the user hovers over the fingerprint icon 52 while the fingerprint is read 525 and in FIG. 5G, the user selects to use the biometric input 520 and the fingerprint icon highlights 525. At FIG. 5H, the app will be set to execute on future inquiries to this service agent 530 and the inquiry may be forwarded to the service agent.

Figure 6:
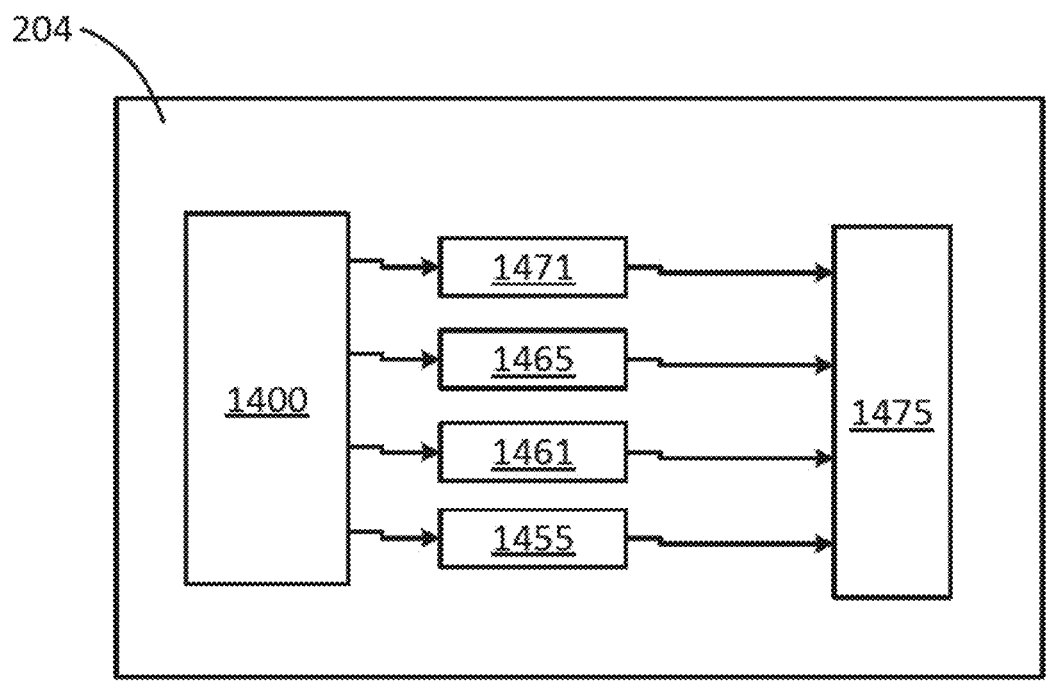
FIG. 6 may be an illustration of a portable computing device.

As a result of the system, the technical problem of verifying users and obtaining data on the users to understand the problems of the user prior to connecting the users to a service agent will be addressed through the technical solution of using biometrics to verify users. Biometrics are harder to guess or steal than traditional name and password type systems. The biometrics are communicated using encryption or tokens to further ensure the biometrics have not been stolen or compromised. Further, users will be pre-qualified, saving server computing time, user time and service agent time as trivial questions about FIG. 6 may be a simplified illustration of the physical elements that make up an embodiment of a computing device, such as the client device 204, and FIG. 7 is a simplified illustration of the physical elements that make up an embodiment of a server type computing device, such as may be used by the service agent. Referring to FIG. 6, a sample computing device is illustrated that is physically configured to be part of the systems and method for using biometrics for verification to a service system. The computing device 204 may have a processor 1451 that is physically configured according to computer executable instructions. In some embodiments, the processor may be specially designed or configured to optimize communication between a server such as system server 202 and the computing device 204 relating to the system described herein. The computing device 204 may have a portable power supply 1455 such as a battery, which may be rechargeable. It may also have a sound and video module 1461 which assists in displaying video and sound and may turn off when not in use to conserve power and battery life. The computing device 204 may also have volatile memory 1465 and non-volatile memory 1471. The computing device 204 may have GPS capabilities that may be a separate circuit or may be part of the processor 1451. There also may be an input/output bus 1475 that shuttles data to and from the various user input/output devices such as a microphone, a camera, a fingerprint reader, a display, or other input/output devices. The computing device 202 also may control communicating with networks either through wireless or wired devices. Of course, this is just one embodiment of a computing device 204 and the number and types of computing devices 202 is limited only by the imagination.

The physical elements that make up an embodiment of a server, such as the service system server 202, are further illustrated in FIG. 7. In some embodiments, the client system server may be specially configured to run the system and methods for the service system and related operations as disclosed herein. At a high level, the service system server 202 may include a digital storage such as a magnetic disk, an optical disk, flash storage, non-volatile storage, etc. Structured data may be stored in the digital storage a database. More specifically, the server 202 may have a processor 1500 that is physically configured according to computer executable instructions. In some embodiments, the processor 1500 may be specially designed or configured to optimize communication between a computing device, such as computing device 204, or between other system nodes such as a requesting node, and the server 202 relating to the system as described herein. The server 202 may also have a sound and video module 1505 which assists in displaying video and sound and may turn off when not in use to conserve power and battery life. The server 202 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, a user data controller for running a user data API may be located on the computing device 204. However, in other embodiments, the user data controller may be located on server 202, or both the computing device 204 and the server 202. Of course, this is just one embodiment of the client system server 202 and additional types of servers are contemplated herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of authenticating a user for services comprising:
   receiving a service request for the services from the user at a service receiver;
   determining if the service request is directed to a known help address;
   determining if authorization is needed by matching the service request to a list of known service addresses;
   receiving, via a display interface, an indication of an acceptance to use a biometric verification app to access the services;
   providing, via the display interface, an option to select the biometric verification app as a default authentication app for future service requests to the known help address that require authentication;
   receiving a selection from the user, via the display interface, to set the biometric verification app as the default authentication app for future service requests to the known help address that require authentication;
   setting the biometric verification app as the default authentication app for future service requests to the known help address that require authentication;

in response to the service request being directed to the known help address,
receiving a biometric input from the user via the biometric verification app;
determining whether the biometric input is over a determined comparison threshold to a known biometric signature for the user;
connecting the service request to a service agent;
accessing data related to the service request for the user to present to the service agent; and
displaying the data related to the service request for the user to the service agent on a user interface.

2. The method of claim 1, further comprising:
determining if the user agrees to use the biometric input to obtain the services;
in response to the user agreeing to use the biometric input:
accessing the biometric input of the user;
storing the biometric input in relation to the data related to the user; and
storing an indication to use the biometric verification app in response to the user making the service request for the services.

3. The method of claim 1, further comprising determining if the user has indicated acceptance to use the biometric verification app to access the services.

4. The method of claim 1, wherein the biometric input is an electronic file.

5. The method of claim 1, wherein the biometric input is at least one of:
a facial recognition scan,
a fingerprint scan or
an iris scan.

6. The method of claim 1, wherein the known help address is a phone address or an IP address.

7. The method of claim 1, further comprising:
obtaining additional data about user services and user equipment;
determining most common problems for the user services and the user equipment; and
preparing to respond with predetermined response to the most common problems for the user services and the user equipment.

8. The method of claim 7, wherein the predetermined response is determined using machine learning on past problems and past solutions for the user services and the user equipment.

9. A non-transitory computer storage medium comprising computer executable instructions to physically configure a processor to perform operations comprising authenticate a user for services comprising computer executable instructions for:
receiving a service request for services from a user at a service receiver;
determining if the service request is directed to a known help address;
determining if authorization is needed by matching the service request to a list of known service addresses;
receiving, via a display interface, an indication of an acceptance to use a biometric verification app to access the services;
providing, via the display interface, an option to select the biometric verification app as a default authentication app for future service requests to the known help address that require authentication;
receiving a selection from the user, via the display interface, to set the biometric verification app as the default authentication app for future service requests to the known help address that require authentication;
setting the biometric verification app as the default authentication app for future service requests to the known help address that require authentication;
in response to the service request being directed to the known help address,
receiving a biometric input from the user via the biometric verification app;
determining whether the biometric input is over a determined comparison threshold to a known biometric signature for the user;
connecting the service request to a service agent;
accessing data related to the service request for the user to present to the service agent; and
displaying the data related to the service request for the user to the service agent on a user interface.

10. The non-transitory computer storage medium of claim 9, the operations further comprising computer executable instructions for:
determining if the user agrees to use the biometric input to obtain the services;
in response to the user agreeing to use the biometric input:
accessing the biometric input of the user;
storing the biometric input in relation to the data related to the user; and
storing an indication to use the biometric verification app in response to the user making the service request for the services.

11. The non-transitory computer storage medium of claim 9, the operations further comprising computer executable instructions for determining if the user has indicated acceptance to use the biometric verification app to access the services.

12. The non-transitory computer storage medium of claim 9, wherein the biometric input is an electronic file.

13. The non-transitory computer storage medium of claim 9, wherein the biometric input is at least one of:
a facial recognition scan,
a fingerprint scan or
an iris scan.

14. The non-transitory computer storage medium of claim 9, wherein the known help address is a phone address or an IP address.

15. The non-transitory computer storage medium of claim 9, the operations further comprising computer executable instructions for:
obtaining additional data about user equipment and user services;
determining most common problems for the user services and the user equipment; and
preparing to respond with predetermined response to the most common problems for the user services and the user equipment.

16. The non-transitory computer storage medium of claim 15, wherein the predetermined response is determined using machine learning on past problems and past solutions for the user services and the user equipment.

17. A computer system comprising a service server comprising:
a processor physically configured according to computer executable instructions,
a memory to store the computer executable instructions and
an input-output circuit, the computer executable instructions which physically configure the processor to perform operations authenticate a user for services comprising computer executable instructions for:

receiving a service request for services from a user at a service receiver;

determining if the service request is directed to a known help address;

determining if authorization is needed by matching the service request to a list of known service addresses;

receiving, via a display interface, an indication of an acceptance to use a biometric verification app to access the services;

providing, via the display interface, an option to select the biometric verification app as a default authentication app for future service requests to the known help address that require authentication;

receiving a selection from the user, via the display interface, to set the biometric verification app as the default authentication app for future service requests to the known help address that require authentication;

setting the biometric verification app as the default authentication app for future service requests to the known help address that require authentication;

in response to the service request being directed to the known help address, receiving a biometric input from the user;

determining whether the biometric input is over a determined comparison threshold to a known biometric signature for the user;

connecting the service request to a service agent;

accessing data related to the service request for the user to present to the service agent; and displaying data related to the service request for the user to the service agent on a user interface.

18. The computer system of claim 17, the operations further comprising computer executable instructions for:

determining if the user agrees to use the biometric input to obtain the services;

in response to the user agreeing to use the biometric input:

accessing the biometric input of the user;

storing the biometric input in relation to the data related to the user; and storing an indication to use the biometric verification app in response to the user making the service request for the services.

19. The computer system of claim 17, the operations further comprising computer executable instructions for determining if the user has indicated acceptance to use the biometric verification app to access the services.

20. The computer system of claim 17, wherein the biometric input is an electronic file.

* * * * *